United States Patent
Lombardo et al.

(12)

(10) Patent No.: US 8,665,614 B2
(45) Date of Patent: Mar. 4, 2014

(54) CONTROL METHOD AND DEVICE FOR SWITCHING POWER SUPPLIES HAVING MORE THAN ONE CONTROL MODE

(75) Inventors: Giovanni Lombardo, Alcamo (IT); Claudio Adragna, Monza (IT); Salvatore Tumminaro, Marianopoli (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1137 days.

(21) Appl. No.: 11/906,132

(22) Filed: Sep. 28, 2007

(65) Prior Publication Data

US 2009/0086513 A1    Apr. 2, 2009

(51) Int. Cl.
*H02M 3/335*    (2006.01)
(52) U.S. Cl.
USPC ............. 363/21.12; 363/21.17; 363/21.18
(58) Field of Classification Search
USPC ............. 363/21.12, 21.17, 21.18
See application file for complete search history.

(56) References Cited

U.S. PATENT DOCUMENTS

| | | | | | |
|---|---|---|---|---|---|
| 4,256,983 | A | * | 3/1981 | Griffith et al. | 327/101 |
| 4,975,823 | A | * | 12/1990 | Rilly et al. | 363/21.16 |
| 5,162,982 | A | * | 11/1992 | Mentler | 363/26 |
| 5,831,838 | A | * | 11/1998 | Illingworth | 363/21.03 |
| 6,567,281 | B2 | * | 5/2003 | Riggio et al. | 363/24 |

* cited by examiner

*Primary Examiner* — Bao Q Vu
(74) *Attorney, Agent, or Firm* — Graybeal Jackson LLP

(57) ABSTRACT

A control device for controlling a switching power supply adapted to convert an input voltage into an output voltage according to a switching rate of a switching element. The control device includes first control means for switching the switching element in a first working mode at a constant frequency and second control means for switching the switching element in a second working mode at a variable frequency, under a maximum frequency, in response to the detection of a predefined operative condition of the switching power supply. The control device further includes means for selecting the first working mode or the second working mode.

23 Claims, 5 Drawing Sheets

CONTROL METHOD AND DEVICE FOR SWITCHING POWER SUPPLIES HAVING MORE THAN ONE CONTROL MODE

TECHNICAL FIELD

Embodiments of the present disclosure relate generally to the field of electronics, and more specifically to the control of switching power supplies.

BACKGROUND

Switching power supplies are widely used to provide regulated voltages and currents to circuit loads. A switching power supply converts an input voltage by temporarily storing energy corresponding to the input voltage and then releasing that energy to the load, so as to obtain a DC output voltage. The storage of energy (carried out with either magnetic components, like inductors and transformers, or capacitors) is controlled by means of a switching element (such as a power MOSFET).

Different circuit topologies are known within the class of the switching power supplies. A well-known topology is that referred to as "flyback topology". As known to those skilled in the art, a switching power supply having the flyback topology, also referred to as "flyback converter", may be directly connected to a main (AC) voltage source, and its (DC) input voltage is obtained by rectifying and filtering the main voltage by means of an input network including a rectifier bridge and a capacitive filter. A flyback converter includes an electric transformer, with the switching element that periodically connects a primary winding of said transformer to the input network (providing the input voltage), in such a way to modulate the energy that is transferred to a secondary winding coupled to the load.

Generally, the flyback converter, like all the switching power supplies, requires a control circuit that carries out the task of properly driving the switching element.

The simplest control circuits of such type—herein referred to as "constant frequency (CF) control circuits"—are designed for driving the switching element with a constant frequency. In this case, the control circuit has a simple circuit architecture, including for example an oscillator and a flip-flop that controls a driver connected to the switching element. Thus, the switching element is opened and closed according to the frequency of the oscillator; by regulating the frequency of the oscillator, it is possible to regulate the transfer of energy, and, thus, the level of the output voltage. The CF control circuit has the advantage of allowing the flyback converter to work according to two different modes.

Particularly, the flyback converter may work in the so-called Continuous Conduction Mode (CCM) or in the so-called Discontinuous Conduction Mode (DCM), depending on the behavior of a current flowing through the secondary winding during the switching cycle of the switching element: in the CCM, the current flows through the secondary winding for the whole period occurring between the opening of the switching element and the closure thereof. Conversely, in the DCM, the current in the secondary winding diminishes so as to reach a null value before the ending of said period.

The DCM is usually exploited when the powers to be managed are low, since in this case it is possible to reduce the sizes of the magnetic components of the converter. For higher powers the CCM is instead preferable, since it allows obtaining a more advantageous current's shape factor.

A more complex family of control circuits for flyback converters consists of control circuits—herein referred to as "Quasi-Resonant (QR) control circuits"—designed for driving the switching element with a frequency that varies over time, depending on the magnetization status of the transformer (which in turn depends on the input voltage and the output current). Particularly, the QR control circuit synchronizes, with a proper delay, the switching of the switching element with the instant at which the current flowing in the secondary winding reaches a null value, in such a way that the switching element is activated when a voltage at a terminal of the switching element connected to the primary winding is near zero. The latter condition is also known as Zero Voltage Switching (ZVS) condition.

Examining in greater detail the behavior of the switching element during the operation of the flyback converter, the voltage at the terminal of the switching element connected to the primary winding—herein referred to as "switching voltage"—starts to oscillate with damped oscillations immediately after the instant at which the current flowing in the secondary winding reaches the null value. In this way, the switching voltage exhibits a sequence of falling edges followed by corresponding rising edges, which determine a corresponding sequence of minimum values, each one representing a possible ZVS conditions.

Since the switching element driven by the QR control circuit is activated very near the instant at which the current of the secondary winding has reached the null value, the operation of the flyback converter corresponds to the boundary between the CCM and DCM. Usually, a flyback converter driven by the QR control circuit has to work with powers under 100 Watts.

Compared to the CF control circuit, the QR control circuit has several advantages.

The most important advantage regards the electromagnetic compatibility. Indeed, being the working frequency variable depending on the input voltage and the output current, the energy irradiated by the converter belongs to a plurality of energy bands. In this way, instead of being concentrated at a single frequency with a high intensity, the electromagnetic emission is distributed among different energy bands with much lower intensities.

Another significant advantage given by the utilization of the QR control circuit regards the possibility of switching the switching element in the ZVS condition. Indeed, since the switching element is usually a MOSFET connected between the primary winding and a ground terminal, in the ZVS condition the voltage across the MOSFET is near to zero, and thus the capacitive losses due to its drain-to-source parasitic capacitance are negligible.

In the variable-frequency operation of the flyback converter, the switching frequency increases when the output load is low ant the input voltage is high. This increase can drastically increment the losses due to parasitic elements of the flyback converter.

This situation is usually addressed by introducing a circuit (implementing a so-called valley skipping technique) that sets a minimum period during which the switching element has to remain activated. In this way, if the ZVS condition occurs before the end of the minimum period, the ZVS condition is ignored, and the switching element remains deactivated. More particularly, the switching element is activated at the occurrence of the ZVS condition corresponding to the first minimum value—in the sequence determined by the oscillations of the switching voltage—after the expiration of the minimum period.

At the present time, the choice of which type of control circuit to be used—between the CF type and the QR type—depends on several and different factors, like for example the personal skill of a technician, the complexity and the cost of the circuit and the amount of power that has to be transferred.

More complex structures of the control circuit have also been proposed.

An example of a control circuit for flyback converters known in the art is the device TEA1654 by Philips. This device is a QR control circuit that normally operates at a variable switching frequency. However, if the switching frequency exceeds a predetermined value, the switching frequency is locked to the value and the device operates in the CF mode. This solution has the great drawback that in the latter condition the switching element may be activated when the switching voltage has a value that is significantly higher than zero (with significant capacitive losses).

Another control circuit for flyback converters known in the art is the device TDA16846/TDA16847 by Infineon. This device is again a QR control circuit that operates at a variable switching frequency. Moreover, the device is capable of always operating in the QR mode, but in such a way to control the switching element with a switching frequency that is as close as possible to a predetermined value. However, since the device always drives the switching element following the occurrences of the ZVS condition, it is not possible to use it for controlling the flyback converter in the CCM.

SUMMARY

More specifically, an embodiment of the present disclosure provides a control device for controlling a switching power supply. The switching power supply is adapted to convert an input voltage into an output voltage according to a switching rate of a switching element. The control device includes first control means for switching the switching element in a first working mode at a constant frequency, and second control means for switching the switching element in a second working mode at a variable frequency, under a maximum frequency, in response to the detection of a predefined operative condition of the switching power supply. The control device further includes means for selecting the first working mode or the second working mode.

In an embodiment of the disclosure, the constant frequency and the maximum frequency depend on a timing frequency of a common timing signal.

The switching power supply may have a flyback architecture including a transformer, and the control device may include means for detecting a zero current condition in a secondary winding of the transformer.

According to an embodiment of the present disclosure, means is provided for detecting stationary points in an auxiliary voltage of an auxiliary winding (oscillating in response to the zero current condition).

In an embodiment of the disclosure, the first control means comprises means for switching the switching element in response to the timing signal, and the second control means comprises means for switching the switching element in response to a first stationary point in the auxiliary voltage after a minimum period corresponding to the maximum frequency.

According to an embodiment of the disclosure, an oscillator is provided for generating the timing signal. Furthermore, the second control means includes means for resetting said oscillator in response to the switching of the switching element.

The switching element may be switched by the second control means after a maximum period (that depends on the timing frequency) without the detection of any stationary point.

Means for switching the switching element in response to a power-on of the power supply may be included in the second control means.

According to an embodiment of the present disclosure, the control device comprises a first input terminal for receiving a frequency indication for setting the timing frequency. In an embodiment of the disclosure, a second input terminal for receiving a working mode indication of the control device is provided. The second input terminal may be further adapted to receive the auxiliary voltage. Another embodiment of the present disclosure provides a power conversion system including the control device and a switching power supply. A further embodiment of the present disclosure provides an electronic apparatus including the system. A still further embodiment of the present disclosure provides a corresponding method for controlling a switching power supply.

BRIEF DESCRIPTION OF THE DRAWINGS

The features and advantages of the present disclosure will be made apparent by the following detailed description of an embodiment thereof, provided merely by way of non-limitative example, which will be conducted making reference to the annexed drawings, wherein.

DETAILED DESCRIPTION

The following discussion is presented to enable a person skilled in the art to make and use the disclosure. Various modifications to the embodiments will be readily apparent to those skilled in the art, and the generic principles herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Figure 1:
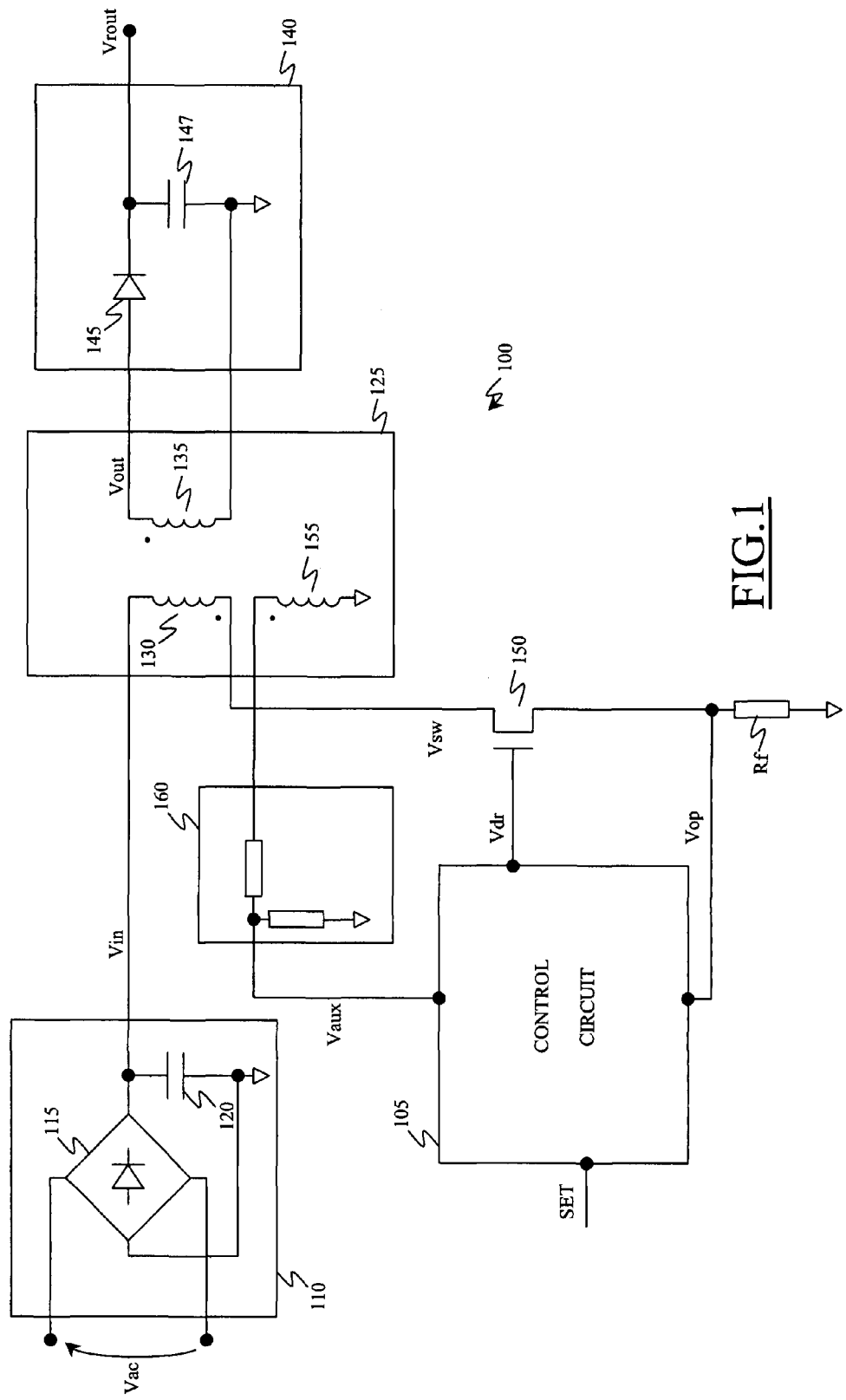
FIG. 1 schematically shows the main circuit components of a flyback converter that can be driven by a control circuit according to an embodiment of the present disclosure.

With reference to the drawings, FIG. 1 schematically shows the main circuit components of a flyback converter 100 that can be driven by a control circuit 105 (in the form of a corresponding device, for example integrated in a chip of semiconductor material) according to an embodiment of the present disclosure.

For the sake of convenience, in the following of the description the voltages and the circuit nodes providing them will be denoted with the same references.

The flyback converter 100 includes an input rectifier block 110, which receives an AC voltage Vac from an AC main source (not shown in the figure) and provides a corresponding DC input voltage Vin. More particularly, the voltage Vac is fed to an input of a rectifier circuit 115—for example, a diode bridge—whose output is coupled to a filter circuit 120—for example, a capacitive filter. The rectifier circuit 115 rectifies the voltage Vac into an output voltage with a fixed polarity but with a pulsating magnitude. The voltage is then filtered by means of the filter circuit 120, so as to smooth the variation in the voltage provided by the rectifier circuit 115 and obtain the input voltage Vin of which the amplitude is substantially constant.

The flyback converter 100 further includes a transformer 125 having the purpose of transforming the input voltage Vin into a corresponding output voltage Vout with a different (particularly, lower) value. The transformer 125 comprises a primary winding 130 magnetically coupled with a secondary winding 135. The primary winding 130 has a first terminal connected to the rectifier block 110 for receiving the input voltage Vin, and a second terminal that is brought to a switching voltage Vsw. The secondary winding 135 has instead the terminals connected to an output stage 140 for providing the output voltage Vout thereto.

The output stage 140 has the purpose of generating a DC regulated output voltage Vrout from the output voltage Vout. The output stage 140 includes a diode 145 having an anode terminal connected to a first terminal of the secondary winding 135 and a cathode terminal connected to a first terminal of an output capacitor 147. The second terminals of the secondary winding 135 and of the output capacitor 147 are connected together to a reference (or ground) terminal. The output capacitor 147 provides the regulated output signal Vrout to an output load (not shown in the figure).

The flyback converter 100 further includes a switching element 150, for example, a power MOSFET. The MOSFET 150 has a drain terminal connected to the second terminal of the primary winding 130 for receiving the switching voltage Vsw, and a source terminal connected to a first terminal of a feedback resistor Rf and to an input terminal of the control circuit 105 for providing an open voltage Vop, whose purpose will be described in the following of the description. The MOSFET 150 further includes a gate terminal that receives (from an output terminal of the control circuit 105) a driving signal Vdr whose value determines the opening or the closure of the MOSFET 150. The feedback resistor Rf has a second terminal connected to the ground terminal.

When the MOSFET 150 is closed, i.e., when it is activated and the drain terminal is electrically coupled with the source terminal, the primary winding 130 receives (from the input rectifier block 110) a current that generates a corresponding magnetic flux increasing the energy stored in the transformer 125. During this operating phase, and according to the reciprocal polarities of the windings 130 and 135 that are shown in the figure, the voltage applied to the diode 145 reverse biases it. Moreover, during this phase, the output capacitor 147, which stores electric charge received in a previous phase, discharges onto the load so as to provide the requested current.

When the MOSFET 150 is opened, i.e., when it is deactivated, and the drain terminal is electrically insulated from the source terminal, the current flowing into the primary winding 130 goes to zero. Moreover, the energy stored in the transformer 125 is transferred to the output load, which receives a current flowing from the secondary winding 135 through the diode 145 (being now forward biased). At the same time, the capacitor 147 is charged by the current coming from the secondary winding 135.

Consequently, the regulated output voltage Vrout takes a value that strongly depends on the duty cycle of the driving signal Vdr.

The transformer 125 further includes an auxiliary winding 155 that is magnetically coupled with the primary winding 135 in such a way to be traversed by the same magnetic flux flowing therethrough. The voltage between the terminals of the auxiliary winding is provided to a voltage divider circuit 160 (for example, a resistive divider) to obtain a corresponding auxiliary voltage Vaux. According to the reciprocal polarities of the windings 130 and 155 that are shown in the figure, and according to the voltage ratio determined by the divider circuit 160, the amplitude of the auxiliary voltage Vaux is proportional to the voltage between the first and second terminals of the primary winding (equal to Vin−Vsw) and has an opposite polarity. The auxiliary voltage Vaux is applied to another input terminal of the control circuit 105.

The control circuit 105 further includes an input terminal for receiving a setting signal SET whose purpose will be apparent in the following.

According to an embodiment of the present disclosure, the control circuit 105 is capable of driving the flyback converter 100 according to two different working modes (being selectable by a user of the flyback converter 100).

More particularly, as will be described in greater detail in the following description, according to a first working mode—referred to as "constant frequency (CF) mode", in relationship with the operation of the CF control circuits described in the introduction of this document—the MOSFET 150 is driven by the control circuit 105 in such a way to switch between the open and the closed conditions with a constant switching frequency. Moreover, according to a second working mode—referred to as "Quasi-Resonant (QR) mode", in relationship with the operation of the QR control circuits previously described—the MOSFET 150 is driven by the control circuit 105 with a switching frequency that varies over time, depending on the magnetization status of the transformer 125.

In this way, the same flyback converter 100 can be used in different scenarios. Indeed, the user of the flyback converter 100 is able to set the preferred working mode, based on the characteristics of the load and the voltage to be converted.

In this way, the flyback converter 100 can provide the best performance in every scenario. For example, it is possible to work normally in the QR mode (between the CCM and the DCM). Moreover, it is possible to switch to the CF mode, so as to work in the CCM for high powers.

Figure 2:
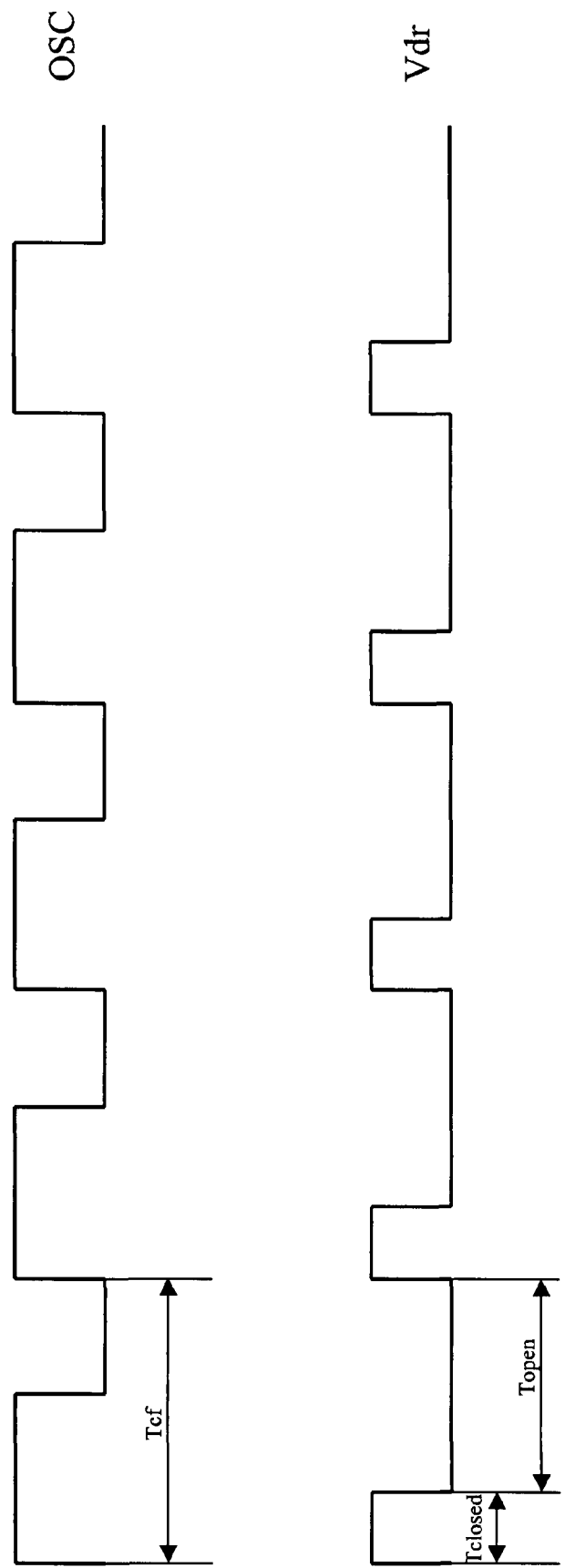
FIG. 2 is a timing diagram illustrating how the flyback converter of FIG. 1 is driven when the control circuit works in the CF mode.
Figure 3A:
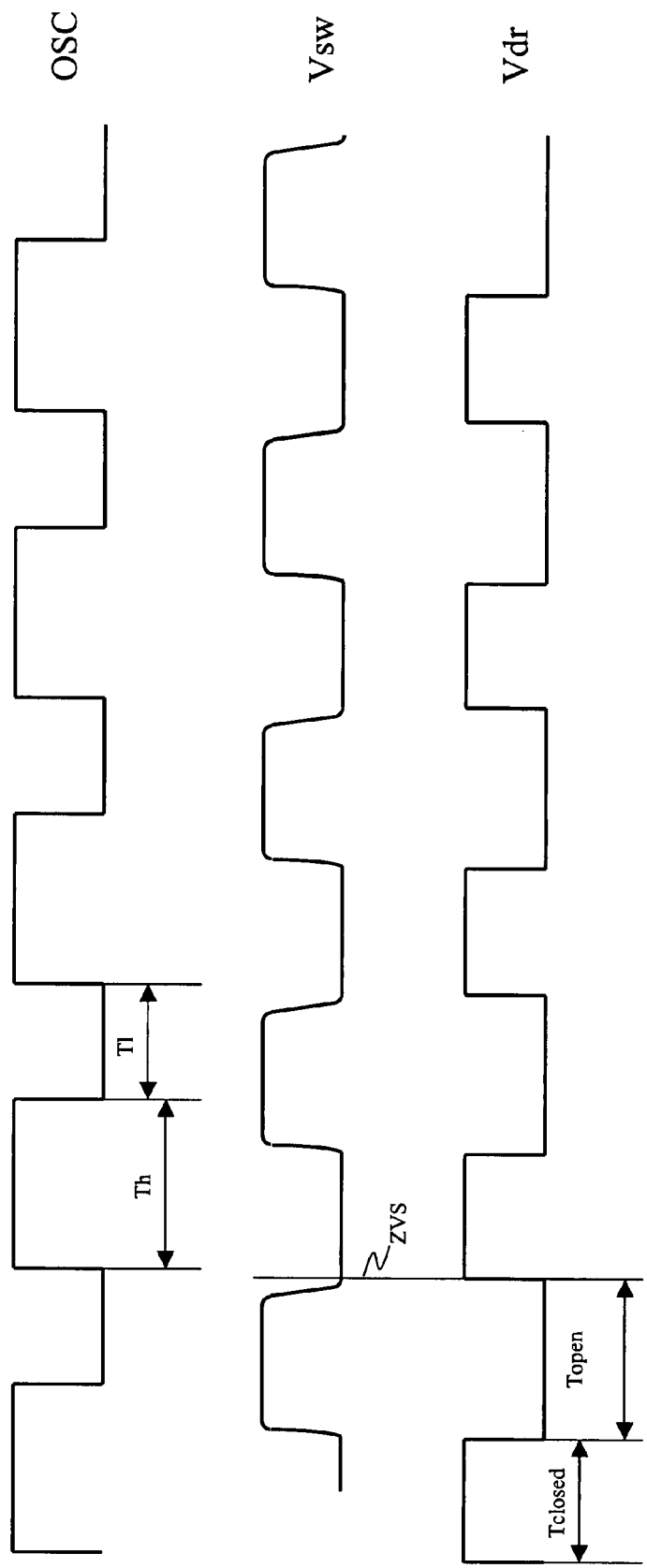
FIGS. 3A and 3B are timing diagrams illustrating how the flyback converter of FIG. 1 is driven when the control circuit works in the QR mode.
Figure 3B:
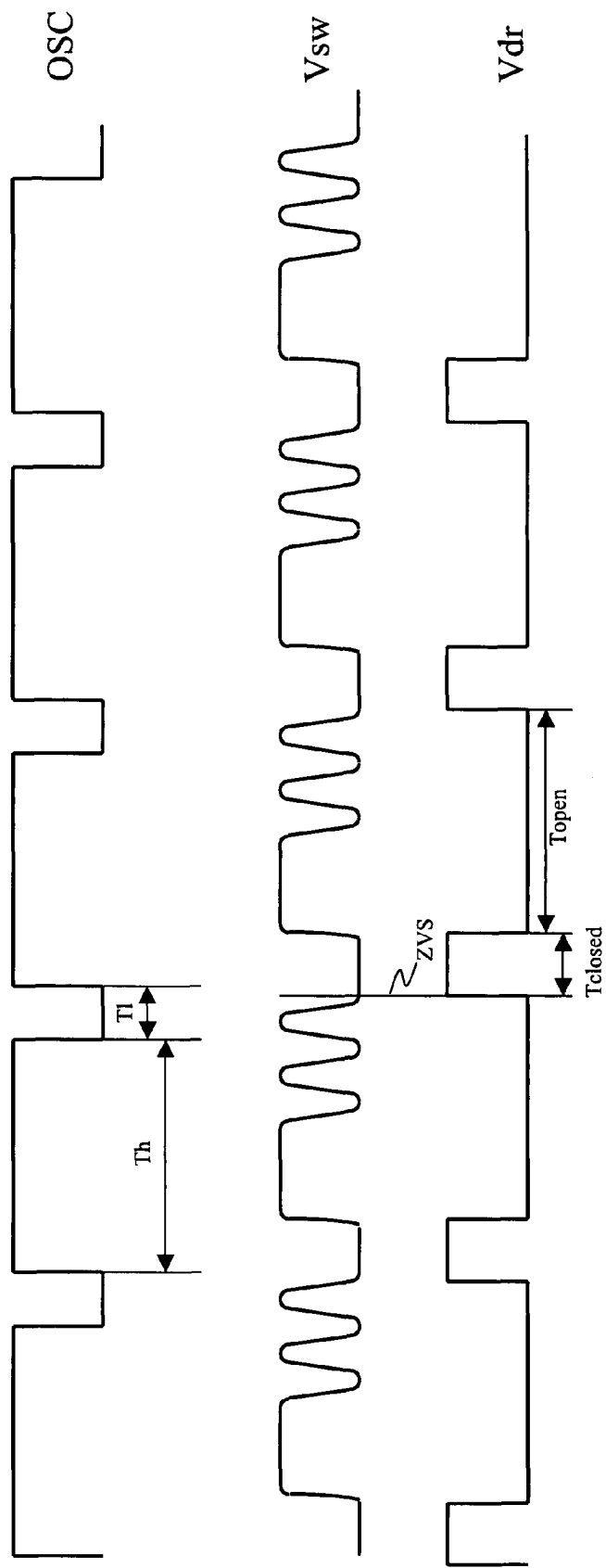

Reference will be now made to FIG. 1 together with FIGS. 2, 3A and 3B, which are timing diagrams illustrating how the flyback converter 100 is driven when the control circuit 105 works in the CF and QR modes.

As will be described in greater detail in the following description, all the operations carried out by the control circuit 105—both in the CF and in the QR modes—are based on a clock signal OSC, which is internally generated in the control circuit 105 itself.

FIG. 2 shows how the control circuit 105 operates in the CF mode.

In the CF mode, the clock signal OSC oscillates with a period Tcf, which directly determines the switching frequency at which the MOSFET 150 of the flyback converter 100 switches between the open and the closed conditions. More particularly, according to this mode, the driving signal Vdr is generated based on the rising edges of the clock signal OSC: every time the clock signal OSC exhibits a rising edge, the driving signal Vdr is brought to a high value, in such a way to close or turn ON the MOSFET 150. The driving signal Vdr remains at the high value for a period Tclosed that depends on the current flowing through the primary winding 130 of the transformer 125. In particular, as far as the MOSFET 150 is in the closed condition, the current flowing through the primary winding 130 of the transformer 125 increases, so that the open voltage Vop accordingly increases. When the open voltage Vop reaches a predetermined value, the driving signal Vdr is brought to a low value, in such a way to open or turn OFF the MOSFET 150. The MOSFET 150 then remains open (for a period Topen) until the next rising edge of the clock signal OSC. Consequently, by varying the frequency of the clock signal OSC it is possible to vary the switching frequency at which the MOSFET 150 switches, and, consequently, the transfer of electric power from the primary winding 130 to the secondary winding 135.

FIGS. 3A and 3B show two different examples of how the control circuit 105 operates in the QR mode.

Referring in particular to FIG. 3A, the clock signal OSC oscillates between a high value and a low value with a variable duty cycle, which depends on the switching voltage Vsw. More particularly, the period at which the clock signal OSC is at the high value—referred to as high period Th—is kept constant, and can be set to a desired value by the user of the flyback converter 100. On the contrary, the period at which the clock signal OSC is at the low value—referred to as low period Tl—varies, since it is determined by the occurrence of a ZVS condition.

More specifically, when the MOSFET 150 is in the closed condition, i.e., when the driving signal Vdr is at the high value, the switching voltage Vsw is low, being substantially equal to the ground voltage. As in the CF mode, the driving signal Vdr remains at the high value for a period Tclosed that depends on the open voltage Vop, and then on the current flowing through the primary winding 130 of the transformer 125. When the driving signal Vdr reaches the low value, the MOSFET 150 switches to the open condition. In this condition, the switching voltage Vsw rises, reaching—after a transient period characterized by the presence of oscillations—a stable value that depends on the input voltage Vin. During this period, the energy stored in the transformer 125 is transferred to the load, which is fed by a current provided by the secondary winding 135. As known to those skilled in the art, when the current flowing in the secondary winding 135 reaches the null value—this condition is referred to as "Zero Current" (ZC) condition—, the switching voltage Vsw starts to oscillate with damped oscillations. Consequently, the switching voltage Vsw exhibits a sequence of falling edges followed by corresponding rising edges—which determine a corresponding sequence of minimum values. Since each minimum value of the sequence corresponds to a substantially null voltage, a corresponding sequence of possible ZVS conditions is established.

As will be described in the following description, the control circuit 105 is able to identify the ZVS conditions by analyzing the behavior of the auxiliary voltage Vaux, since the amplitude of the auxiliary voltage Vaux is proportional to Vin−Vsw. At the instant at which the switching voltage Vsw has the first minimum value in the sequence, the control circuit 105 checks if the clock signal OSC is at the low value or not.

In case the clock signal OSC is at the low value—that is, in case the high period Th is expired—the driving signal Vdr is driven to the high value, in such a way that the MOSFET 150 is switched to the closed condition.

Conversely, in case the clock signal OSC is at the high value—i.e., in case the minimum value occurs when the high period Th is not expired yet—the driving signal Vdr is kept at the low value, so that the MOSFET 150 remains in the open condition. In this case, the control circuit 105 repeats the same operations for the next minimum value of the switching voltage Vsw in the sequence.

In the example illustrated in the FIG. 3A, the first minimum value of the switching voltage Vsw in the sequence occurs when the clock signal OSC is at the low value, so that the driving signal Vdr is switched to the high value immediately.

Conversely, in the example illustrated in the FIG. 3B both the first two minimum values of the switching voltage Vsw in the sequence occur when the clock signal OSC is at the high value. In this case, the driving signal Vdr is switched to the high value at the third minimum value, which occurs when the clock signal OSC is at the low value.

When the driving signal Vdr is driven to the high value, the clock signal OSC is reset to the high value. In this way, the clock signal OSC is always synchronized with the rising edges of the driving signal Vdr.

Using this solution (also referred to as "valley skipping", since each minimum value is a stationary point placed at the bottom of a "valley"), it is possible to establish the maximum switching frequency of the MOSFET 150 by setting the duration of the high period Th of the clock signal OSC. It has to be appreciated that this solution allows the MOSFET 150 to switch always in a ZVS condition, so that the capacitive losses are reduced.

Figure 4:
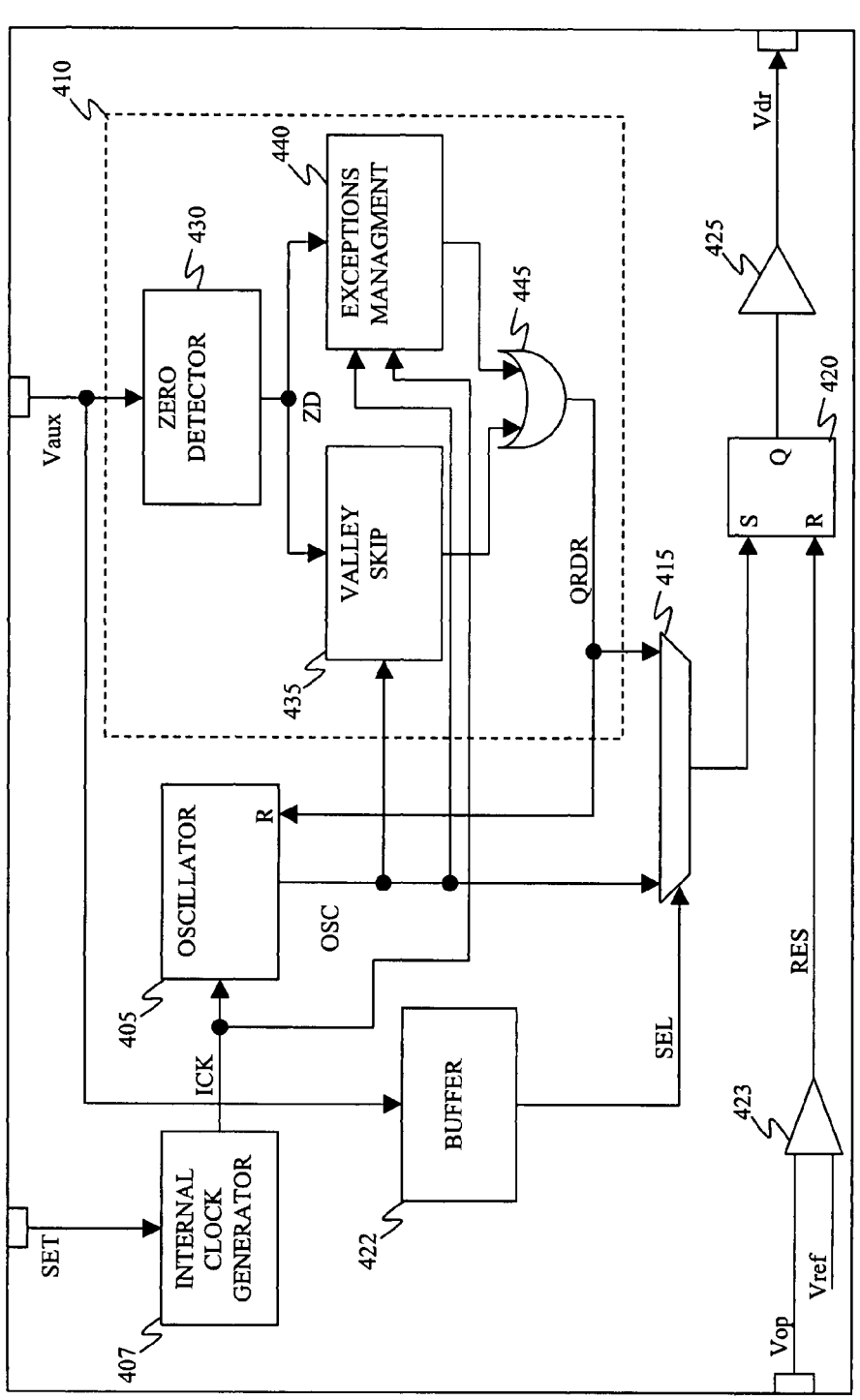
FIG. 4 is a schematic diagram of the main functional blocks included in the control circuit of FIG. 1 according to an embodiment of the present disclosure.

Referring now to FIG. 4, a schematic diagram of the main functional blocks included in the control circuit 105 is illustrated according to an embodiment of the present disclosure.

The control circuit 105 includes an oscillator block 405 coupled with an internal clock generator block 407. The oscillator block 405 has the purpose of generating the clock signal OSC based on the frequency of an internal clock signal ICK generated by the clock generator block 407. According to an embodiment of the present disclosure, the frequency of the internal clock signal ICK, and thus the frequency of the clock signal OSC, can be set by means of the setting signal SET, which is fed to the internal clock generator block 407 from the outside. For example, the frequency of the internal clock signal ICK may be proportional to the amplitude of the setting signal SET. It has to be appreciated that, according to this solution, the operations carried out by the control circuit 105 in the CF mode and in the QR mode are based on a same signal, i.e., the internal clock signal ICK. Indeed, the clock signal OSC, whose behavior varies according to the selected mode, always depends on the frequency of the internal clock signal ICK. In this way the control circuit 105 has to include a single internal clock generator block 407.

The clock signal OSC is provided to a QR block 410 and to a first input of a selector 415, for example a multiplexer.

The QR block 410 is in charge of the management of the operations necessary for driving the flyback converter in the QR mode. The QR block 410 further receives the auxiliary voltage Vaux—from the voltage divider circuit of the flyback circuit—and accordingly generates a QR driving signal QRDR that is provided to a second input terminal of the selector 415.

Depending on a chosen mode between the CF and the QR modes, the clock signal OSC or the QR driving signal QRDR are selected by the selector 415 and are provided to a set input of a SR flip-flop 420. Particularly, according to the value of a selection signal SEL provided to a selection terminal of the selector 415, the set input of the SR flip-flop 420 is fed with the clock signal OSC (CF mode) or with the QR driving signal QRDR (QR mode). For this purpose, the control circuit 105 includes a buffer block 422 that is adapted to receive the selection signal SEL from the outside and to latch its value. According to an embodiment of the present disclosure, the selection signal SEL is fed to the buffer block 422 from the outside through the same terminal adapted to receive the auxiliary voltage Vaux. In this case, the values the selection signal SEL is expected to take must be different with respect to those of the voltage range defined by the auxiliary voltage Vaux.

The SR flip-flop 420 further includes a reset terminal receiving a reset signal RES from an output of a comparator 423 and an output terminal coupled to a driver 425. The driver 425, for example, a non-inverting buffer circuit, is adapted to generate the driving voltage Vdr in response to the output of the SR flip-flop 420. The comparator 423 has a first input for receiving (from the flyback converter) the open voltage Vop, and a second input receiving a predetermined reference voltage Vref. When the open voltage Vop is lower than the reference voltage Vref, the reset signal RES is at the low value. Conversely, as soon as the open voltage Vop becomes higher than the reference voltage Vref, the reset signal RES switches to the high value.

The QR block 410 includes a zero detector block 430 receiving the auxiliary voltage Vaux, and outputting a zero detection indication ZD each time the auxiliary voltage Vaux exhibits a falling edge followed by a consecutive rising edge. Circuits of this type are known to those skilled in the art, and usually include a comparator with hysteresis.

The zero detection indication ZD is provided to a valley skip block 435 and to an exceptions management block 440. Both the valley skip block 435 and the exceptions management block 440 also receive the clock signal OSC from the oscillator block 405. The exceptions management block 440 still further receives the internal clock signal ICK from the clock generator block 407.

Based on the value of the clock signal OSC, the valley skip block 435 may ignore the zero detection indication ZD or not, as it has been described in greater detail with reference to the FIGS. 3A and 3B. If the zero detection indication ZD occurred when the clock signal OSC is at the low value (meaning that the corresponding ZVS condition respects the maximum frequency requirements), the valley skip block 435 provides a (positive) pulse to a first input of an OR logic port 445, whose output generates the QR driving signal QRDR.

The exceptions management block 440 has the purpose of generating a (positive) pulse to a second input of the OR logic port 445 in case the zero detector block 430 does not generate a zero detection indication ZD after a predetermined period—e.g., after a predetermined number of periods of the internal clock signal ICK—because the oscillations of the auxiliary voltage Vaux are too damped. Moreover, the exceptions management block 440 outputs a pulse to the second input of the OR logic port 445 at the power-on of the flyback converter.

The output of the OR logic port 445 is further connected to a reset terminal of the oscillator block 405, in such a way that when the QR driving signal QRDR goes to the high value (i.e., when the valley skip block 435 or the exceptions management block 440 output a positive pulse), the oscillator block 405 is reset, that is, the clock signal OSC is switched to the high value and a new high period Th is initiated.

When the CF mode is selected the set terminal of the SR flip-flop 420 receives the clock signal OSC, and its reset terminal is fed with the reset signal RES. Thus, as it has been described with reference to FIG. 2, the driving signal Vdr is made to switch to the high value every time the clock signal OSC exhibits a rising edge, and to the low value every time the open voltage Vop reaches the value of the reference voltage Vref. In addition, the driving signal Vdr may be also made to switch to the low value after a predetermined maximum period—for example, proportional to the period of the internal clock signal ICK—is expired.

When the QR mode is selected, the set terminal of the SR flip-flop 420 is fed with the QR driving signal QRDR, and its reset terminal is fed again with the reset signal RES. Thus, as it has been described with reference to FIGS. 3A and 3B, the driving signal Vdr is made to switch to the high value every time a ZVS condition has been established (i.e., when a zero detection indication ZD is generated) under the maximum frequency requirements established by the high period Th of the clock signal OSC. In any case, the driving signal Vdr is made to switch to the high voltage after the maximum period without the detection of any ZVS condition. Moreover, the driving signal Vdr switches to the high value immediately after the power-on of the flyback converter (when no ZVS conditions are still established). As above, the driving signal Vdr is made to switch to the low value every time the open voltage Vop reaches the value of the reference voltage Vref.

The control circuit 105 herein proposed requires a reduced number of input/output terminals for receiving/providing voltages from/to the flyback converter. Particularly, the control circuit 105 includes a terminal for providing the driving signal Vdr, a terminal for receiving the open voltage Vop, a terminal for receiving the auxiliary voltage Vaux and a terminal for receiving the setting signal SET.

Naturally, in order to satisfy local and specific requirements, a person skilled in the art may apply to the solution described above many logical and/or physical modifications and alterations. More specifically, although the present disclosure has been described with a certain degree of particularity with reference to embodiment(s) thereof, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof. Conversely, well-known features may have been omitted or simplified in order not to obscure the description with unnecessary particulars. Moreover, it is expressly intended that specific elements and/or method steps described in connection with any disclosed embodiment of the disclosure may be incorporated in any other embodiment as a matter of general design choice.

Particularly, similar considerations apply if the control device has a different structure or includes equivalent elements. Moreover, the input voltage and/or the output voltage can take any value. In any case, the MOSFET may be replaced with a bipolar transistor, or more generally with any other equivalent switching element.

Even if reference has been made to a control device for a flyback converter, similar considerations can be applied to different types of switching power supplies.

In a very simplified implementation, it is also possible to provide two distinct oscillators for the CF mode and the QR mode.

The concepts of the present disclosure are also applicable in case the zero current condition is detected in another way, for example, by directly analyzing the input voltage of the primary winding.

In any case, concepts of the present disclosure are also applicable in case the means for detecting the stationary points (i.e., minimum or maximum values) in the auxiliary voltage are capable of detecting a stationary point different than the first stationary point in the auxiliary voltage after the minimum period defined by the maximum frequency.

Similar considerations apply if the oscillator is replaced with any equivalent element capable of timing the CF mode and the QR mode (for example, based on a counter).

Even if less efficient, the concepts of the present disclosure are also applicable without the presence of means for switching the switching element after a maximum period.

Alternatively, it is possible to use the same circuit for switching the switching element after the maximum period also at the power-on of the flyback converter (even without a dedicated circuit for this purpose).

Similar considerations apply if the control device has a different number of input and/or output terminals.

It should be readily apparent that the proposed structure might be part of the design of an integrated circuit. Furthermore, the proposed solution may be integrated with other circuits in the same chip, or it may be mounted in intermediate products. In any case, the integrated circuit is suitable to be used in complex systems such as computer systems, control systems, and in portable electronic devices where Vin would typically be supplied by a battery and the rectifier block 110 omitted.

From the foregoing it will be appreciated that, although specific embodiments of the disclosure have been described herein for purposes of illustration, various modifications may be made without deviating from the spirit and scope of the invention.

What is claimed is:

1. A control device for controlling a switching power supply, the switching power supply being adapted to convert an input voltage into an output voltage according to a switching rate of a switching element, wherein the control device includes:
   first control circuit for switching the switching element in a first working mode at a constant frequency;
   second control circuit for switching the switching element in a second working mode at a variable frequency in response to the detection of a predefined operative condition of the switching power supply, such that the variable frequency does not exceed a predetermined maximum frequency related to a predetermined minimum output voltage; and
   a selection circuit for selecting the first working mode or the second working mode.

2. The control device of claim 1, further including a timing circuit for generating a timing signal having a timing frequency, the constant frequency and the maximum frequency depending on the timing frequency.

3. The control device of claim 1, wherein the switching power supply has a flyback architecture, and includes a transformer having a primary winding for selectively receiving the input voltage through the switching element, and a secondary winding for providing the output voltage, the second control circuit including:
   a detection circuit for detecting the operative condition by detecting a zero current condition corresponding to a substantial null current flowing through the secondary winding.

4. The control device of claim 3, wherein the switching power supply includes an auxiliary winding coupled with the primary winding for providing an auxiliary voltage corresponding to the input voltage, the auxiliary voltage oscillating in response to the zero current condition with a succession of stationary points, and wherein the detection circuit is operable to detect the stationary points in the auxiliary voltage.

5. The control device of claim 4, wherein:
   the first control circuit is operable to switch the switching element in response to the timing signal; and
   the second control circuit is responsive to the timing signal for detecting a first stationary point in the auxiliary voltage after a minimum period corresponding to the maximum frequency and responsive to the first control circuit for switching the switching element in response to said first stationary point.

6. The control device of claim 5, wherein:
   the timing circuit includes an oscillator for generating the timing signal; and
   the second control circuit further operable to reset the oscillator in response to the switching of the switching element.

7. The control device of claim 5, wherein the second control circuit is further responsive to the timing signal for switching the switching element after a maximum period depending on the timing frequency without the detection of any stationary point in the auxiliary voltage.

8. The control device of claim 1, wherein the second control circuit is further operable to switch the switching element in response to a power-on of the switching power supply.

9. The control device of claim 2, further including a first input terminal for receiving a frequency indication, the timing circuit operable to set the timing frequency according to the frequency indication.

10. The control device of claim 4, further including a second input terminal for receiving a working mode indication, the selection circuit being adapted to select the first working mode or the second working mode according to said working mode indication.

11. The control device of claim 10, wherein the second input terminal is further adapted to receive the auxiliary voltage for the detection circuit, the second control device further operable to discriminate the working mode indication and the auxiliary voltage at the second input terminal.

12. A power conversion system, including:
   a switching power supply adapted to convert an input voltage into an output voltage according to a switching rate of a switching element; and
   a control device coupled to the switching power supply, the control device operable in a first mode to control the switching element at a constant frequency and operable in a second mode to control the switching element responsive to a switching voltage generated on a node of the switching element and responsive to a first clock signal generated by the control device and wherein the control device is further operable to select the first mode or the second mode responsive to a selection signal.

13. The power conversion system of claim 12 wherein the control device further comprises an exceptions management circuit operable to activate the switching element if the switching element has not been activated responsive to the switching voltage after a predetermined time.

14. The power conversion system of claim 12 wherein the switching power supply comprises a flyback converter.

15. An electronic system, comprising:
   electronic circuitry; and
   a power conversion system coupled to the electronic circuitry, the power conversion system comprising:
      a switching power supply adapted to convert an input voltage into an output voltage according to a switching rate of a switching element; and
      a control device coupled to the switching power supply, the control device operable in a first mode to control the switching element at a constant frequency and operable in a second mode to control the switching element responsive to a switching voltage developed on a node of the switching element and responsive to a first clock signal generated by the control device and wherein the control device is further operable to select the first mode or the second mode responsive to a selection signal.

16. The electronic system of claim 15 wherein the electronic circuitry comprises computer circuitry.

17. A method for controlling a switching power supply, the switching power supply being adapted to convert an input voltage into an output voltage according to a switching rate of a switching element, wherein the method includes the steps of:
selecting a first working mode or a second working mode;
switching the switching element at a constant frequency in the first working mode; and
switching the switching element at a variable frequency, without exceeding a maximum frequency related to the output voltage, in response to the detection of a predefined operative condition of the switching power supply in the second working mode.

18. The method of claim 17 wherein the predefined operative condition comprises an oscillation of a switching voltage developed on a first node of the switching element.

19. The method of claim 18 wherein the detection of the predefined operative condition further comprises detection of an auxiliary voltage having a value that is function of the value of the switching voltage.

20. The method of claim 18 wherein detection of the predefined operative condition further comprises:
detecting a zero voltage switching condition of the switching voltage;
detecting whether a clock signal has a first or a second edge;
when the clock signal has the second edge, activating the switching element; and
deactivating the switching element responsive to an open voltage developed on a second node of the switching element reaching a threshold value.

21. The method of claim 20 wherein detection of the predefined operative condition further comprises
when the clock signal has the first edge, activating the switching element after a predefined number of zero voltage switching conditions of the switching voltage have been detected.

22. The method of claim 21 wherein,
activating the switching element comprises applying an active driving signal to the switching element; and
wherein the method further comprises synchronizing the clock signal and the driving signal responsive to the active driving signal.

23. A method for controlling a switching power supply, the switching power supply being adapted to convert an input voltage into an output voltage according to a switching rate of a switching element, wherein the method includes the steps of:
selecting a first working mode or a second working mode;
switching the switching element at a constant frequency in the first working mode; and
switching the switching element at a variable frequency, without exceeding a maximum frequency, in response to the detection of a predefined operative condition of the switching power supply in the second working mode; and
wherein switching the switching element at the constant frequency in the first working mode comprises:
generating a clock signal;
activating the switching element responsive to rising edges of the clock signal; and
deactivating the switching element responsive to an open voltage developed on a node of the switching element reaching a threshold value.

* * * * *